United States Patent [19]
Eickemeyer et al.

[11] Patent Number: 6,021,481
[45] Date of Patent: Feb. 1, 2000

[54] EFFECTIVE-TO-REAL ADDRESS CACHE MANAGING APPARATUS AND METHOD

[75] Inventors: Richard James Eickemeyer, Rochester; Ronald Nick Kalla, Zumbro Falls, both of Minn.

[73] Assignee: International Business Machines Corporation, Armonk, N.Y.

[21] Appl. No.: 08/966,706

[22] Filed: Nov. 10, 1997

[51] Int. Cl.[7] ................................................ G06F 12/10
[52] U.S. Cl. ........................... 711/207; 711/210; 711/144
[58] Field of Search .................................... 711/206, 207, 711/208, 210, 144; 709/108; 712/228, 229

[56] References Cited

U.S. PATENT DOCUMENTS

| | | | |
|---|---|---|---|
| 5,437,017 | 7/1995 | Moore et al. | 709/213 |
| 5,440,710 | 8/1995 | Richter et al. | 711/207 |
| 5,530,824 | 6/1996 | Peng et al. | 711/207 |
| 5,604,879 | 2/1997 | Beavers et al. | 711/207 |
| 5,652,872 | 7/1997 | Richter et al. | 395/500.47 |
| 5,898,864 | 4/1999 | Golla et al. | 712/228 |
| 5,937,437 | 8/1999 | Roth et al. | 711/202 |

*Primary Examiner*—John W. Cabeca
*Assistant Examiner*—Christopher S. Chow
*Attorney, Agent, or Firm*—Birch, Stewart, Kolasch & Birch

[57] ABSTRACT

An effective-to-real address translation cache management apparatus and method utilizes an effective-to-real address translation cache segment register latch having a bit corresponding to each of the segment registers. When a segment register is utilized to perform an effective-to-real address translation, which is stored in the effective-to-real address translation cache, the corresponding bit in the effective-to-real address translation cache segment register latch is set. In this way, a record is kept of which segment registers are currently mapped in the effective-to-real address translation cache. When a move to segment register instruction alters the content of a segment register, then the effective-to-real address translation cache segment register latch is examined to determine if that segment register has been mapped in the effective-to-real address translation cache. If so, then an effective-to-real address translation cache invalidation latch is set. Otherwise, the move to segment register has no effect on the effective-to-real address translation cache. When a context synchronizing event occurs, the effective-to-real address translation cache invalidation latch is examined to determine whether or not to invalidate the effective-to-real address translation cache. In this way, the frequency of effective-to-real address translation cache invalidation may be reduced thereby increasing processor efficiency.

11 Claims, 6 Drawing Sheets

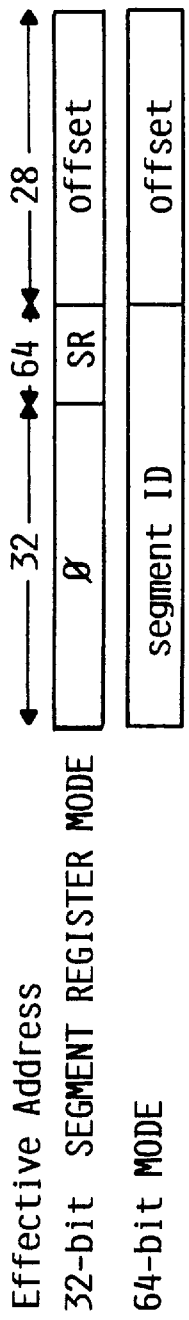
FIGURE 3A
Effective Address
32-bit SEGMENT REGISTER MODE
64-bit MODE
FIGURE 3C
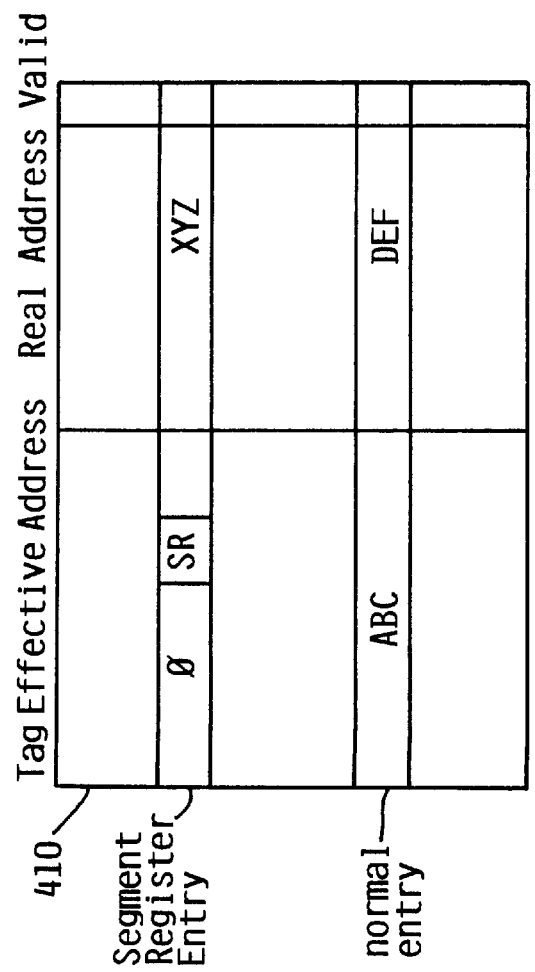
FIGURE 3B
FIGURE 3D

EFFECTIVE-TO-REAL ADDRESS CACHE MANAGING APPARATUS AND METHOD

TECHNICAL FIELD OF THE INVENTION

This invention relates to a method and apparatus for managing an effective-to-real address translation cache.

BACKGROUND OF THE INVENTION

Computers are an essential component of modern life. Increasing the speed and efficiency of computers is a common goal being pursued by a variety of companies.

As is generally known, computers use a variety of addressing schemes to access main store memory to retrieve instructions and data. The address actually applied to the main store memory is often referred to as a real address, an effective address is the address actually referred to by programmers, and a virtual address is intermediate to the real address and the effective address.

Because programmers generally refer to an effective address when constructing computer programs, the effective address must be translated first to a virtual address and then to a real address before main store memory can be accessed. To achieve increased computer performance and speed, this address translation process must be efficiently performed.

As mentioned above, many conventional computer architectures first translate the effective address to a virtual address and then translate the virtual address to a real address. The PowerPC® architecture includes two modes for performing this address translation. In the 32-bit mode, high speed segment registers (SR) are employed to obtain the virtual address by parsing a field in the effective address that specifies one of 16 segment registers, each of which stores a corresponding virtual address. This virtual address is then concatenated with another field of the effective address, hashed, and then utilized to access a translation lookaside buffer (TLB) to obtain the real address.

Another way to perform effective-to-real address translation is to utilize a 64-bit mode, in which a segment ID or tag field of the effective address is utilized to access a segment lookaside buffer (SLB) to obtain the virtual address. This virtual address is then used to access the TLB and thereby obtain the real address.

Each of the above-described effective-to-real address translations involves a two-stage process and consumes valuable processor cycles. A conventional solution to speed up this effective-to-real address translation is to utilize an effective to real address translation cache which stores the most recent translations (e.g., 16 translations per thread or 32 translations for a single-threaded processor). Using an effective-to-real address translation cache skips the two steps of address translation from the effective to virtual address and then from the virtual to the real address. In this way, the processor need only access the effective-to-real address translation cache to obtain the address of the last 16 or 32 translations.

Although an effective-to-real address translation cache can speed up the address translation process, the validity of the translations stored therein must be accurately maintained. During normal address translation or other processing, a page or a segment table may be altered. This alteration must be reflected to the effective-to-real address translation cache to maintain cache integrity. This situation occurs when an instruction such as a move to segment register (MTSR) has been executed. The move to segment register instruction specifies one of the segment registers and changes its value. Because the segment registers map on a segment basis which include a plurality of pages, changing the value stored by the segment register has a cascade-like effect, which renders all corresponding entries in the ERAT stale and inaccurate.

One conventional solution for managing the effective-to-real address translation cache to ensure address translation integrity, is to blindly throw out or discard all of the values in the entire effective-to-real address translation cache upon the occurrence of a move to segment register instruction. However, the performance impact of this conventional solution is severe. Changing all of the valid bits in all of the effective-to-real address translation cache entries to zero is a time-consuming process that severely effects the performance of the computer architecture.

Another conventional solution is to construct the effective-to-real address translation cache with a content addressable memory. With such a construction, when there is a move to segment register instruction, the context addressable logic can specifically identify the corresponding entry in the effective-to-real address translation cache and invalidate the identified entry. Although this conventional solution avoids invalidating the entire effective-to-real address translation cache, the content addressable memory array for implementing the effective-to-real address translation cache is four times larger than a conventionally implemented effective-to-real address translation cache. Furthermore, the context addressable memory logic is quite complex and slow, and thereby reduces the speed of the address translations and negatively affects processor performance.

Therefore, there is a need for efficiently managing an effective-to-real address translation cache which does not require a content addressable memory array and which does not significantly effect processor performance.

OBJECTS AND SUMMARY OF THE INVENTION

An object of the invention is to address the disadvantages of the conventional effective to real address translation cache management systems.

Another object of the invention is to efficiently manage an effective-to-real address translation cache.

Still another object of the invention is to invalidate the effective-to-real address translation cache only when necessary so as to reduce the effect on processor efficiency.

Yet another object of the invention is to keep track of which segment registers have been altered by a move to segment register instruction to more effectively manage an effective-to-real address translation cache.

Yet another object of the invention is to keep track of when an effective-to-real address translation cache should be invalidated and wait until a context-synchronizing event occurs until invalidating the effective-to-real address translation cache.

The objects of the present invention are achieved by utilizing an effective-to-real address translation cache segment register latch having a bit corresponding to each of the segment registers. In this way, when the contents of a segment register have been altered, then a corresponding bit in the effective-to-real address translation cache segment register latch can be set to keep track of this event.

The objects of the invention are further achieved by examining the effective-to-real address translation cache segment register latch every time a move to segment register instruction is executed to determine whether the segment register being altered has already been utilized to generate an effective-to-real address translation that is stored in the effective-to-real address translation cache. If this comparison determines that the segment register being effected by the move to segment register instruction has already been utilized to generate an address stored in the effective-to-real address translation cache, then an effective-to-real address translation cache invalidate pending latch is set.

The objects of the invention are still further achieved by waiting to invalidate the effective-to-real address translation cache until a context synchronizing operation occurs. When the context synchronizing operation does occur, then the effective-to-real address translation cache invalidate pending latch is checked. If the effective-to-real address translation cache invalidate pending latch is set, then the effective-to-real address translation cache can then be invalidated. Thereafter, the effective-to-real address translation cache segment register latch and the effective-to-real address translation cache invalidate pending latch can then be cleared or reset.

The objects of the invention are even further achieved by providing an effective-to-real address translation cache management apparatus, including: an effective-to-real address translation cache storing recent effective-to-real address translations; an effective-to-real address translation cache segment register latch having at least one bit for each segment register; an effective-to-real address translation cache invalidate pending latch; a loading device for loading the effective-to-real address translation cache with an effective-to-real address translation upon an effective-to-real address translation cache miss with an address generated by one of the segment registers and a translation lookaside buffer; a device for setting a bit of the effective-to-real address translation cache segment register latch corresponding to the segment register utilized by the loading device; a device for setting the effective-to-real address translation cache invalidate pending latch when a value stored by one of the segment registers is altered and when a corresponding bit in the ERAT segment register latch has already been set for the segment register whose contents have been altered; and an invalidating device for invalidating the effective-to-real address translation cache when a context-synchronizing event occurs and the effective-to-real address translation cache invalidate pending latch is set.

The objects of the invention are still further achieved by providing a method of managing an effective-to-real address translation cache, including the steps of: storing recent effective-to-real address translations in the effective-to-real address translation cache; providing an effective-to-real address translation cache segment register latch having at least one bit for each segment register, providing an effective-to-real address translation cache invalidate pending latch; loading the effective-to-real address translation cache with an effective-to-real address translation upon an effective-to-real address translation cache miss with an address generated by a segment register and a translation lookaside buffer; setting a bit of an effective-to-real address translation cache segment register latch corresponding to the segment register utilized by the loading step; setting the effective-to-real address translation cache invalidate pending latch when a value stored by one of the segment registers is altered and when a corresponding bit in the effective-to-real address translation cache segment register latch has already been set for the segment register whose contents have been altered; and invalidating the effective-to-real address translation cache when a context-synchronizing event occurs and the effective-to-real address translation cache invalidate pending latch is set.

The objects of the invention are even still even further achieved by providing the loading step with the following substeps: loading the effective-to-real address translation cache with an effective-to-real address translation upon an effective-to-real address translation cache miss with an address generated by one of the segment registers and the translation lookaside buffer when a segment register address generation mode is active; and loading the effective-to-real address translation cache with an effective-to-real address translation upon an effective-to-real address translation cache miss with an address generated by a segment lookaside buffer and the translation lookaside buffer when the segment register address generation mode is not active.

The objects of the invention are still further achieved by having the step of setting the effective-to-real address translation cache invalidate pending latch set the effective-to-real address translation cache invalidate pending latch when a move to segment register instruction has been performed thereby altering a value stored by one of the segment registers and when a corresponding bit in the effective-to-real address translation cache segment register latch has already been set for the segment register whose contents have been altered by the move to segment register instruction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3a is a diagram showing the fields of an effective address in a 32-bit segment register mode and a 64-bit mode;

FIG. 3b is a diagram of an effective-to-real address translation cache;

FIG. 3c is a diagram of the effective-to-real address translation cache latch according to the present invention;

FIG. 3d is a diagram of the effective-to-real address translation cache invalidate pending latch according to the present invention;

DETAILED DESCRIPTION OF THE PREFERRED EMBODIMENTS

Figure 1:
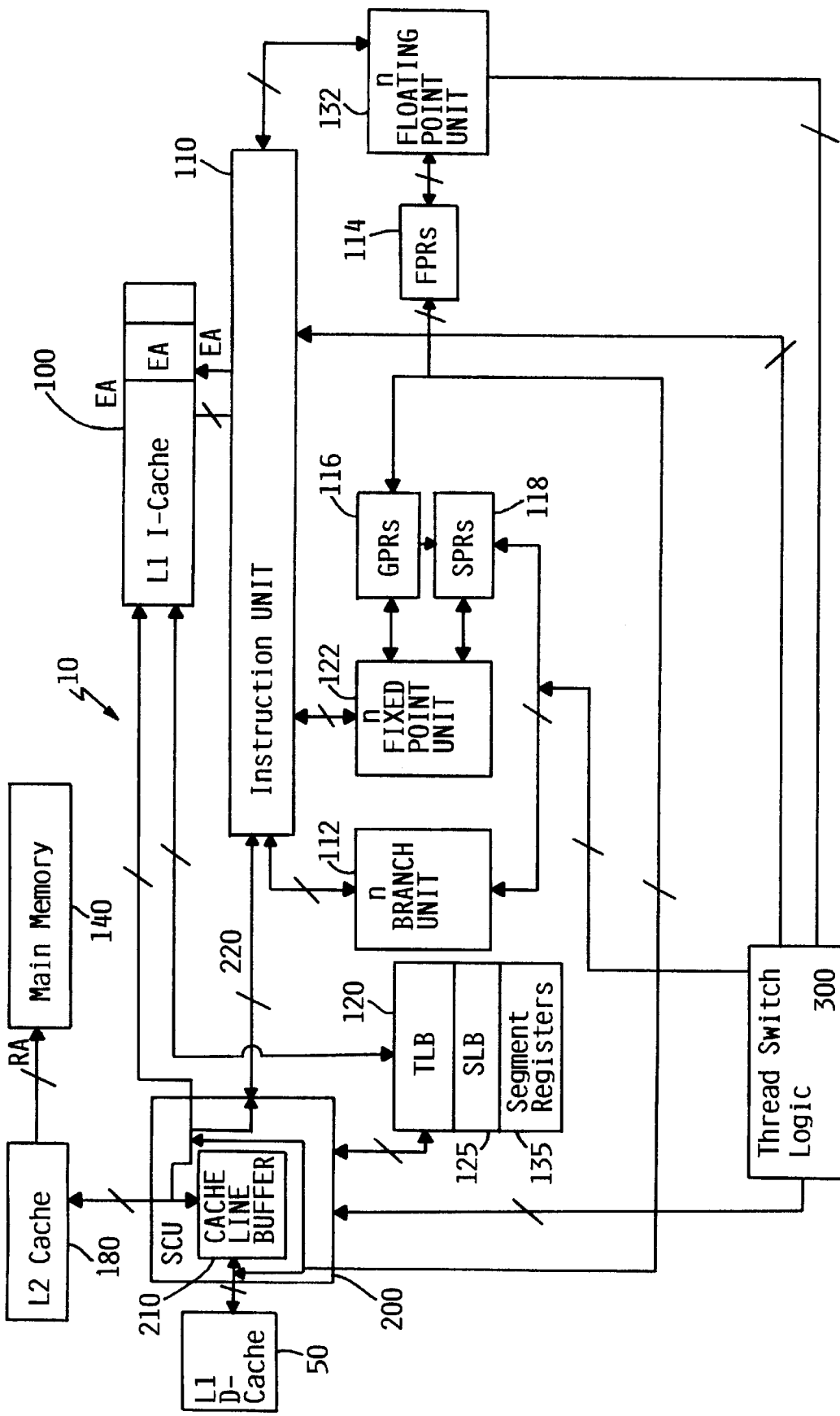
FIG. 1 is a high-level block diagram of a computer architecture that incorporates the effective-to-real address translation cache management apparatus and method of the present invention.

FIG. 1 illustrates a computer architecture including an instruction unit 110, to which is attached conventional elements such as a level 1 Instruction cache (L1 I-cache) 100, n branch unit 112, n fixed point unit 122, n floating point unit 132 and thread switch logic 300. Various, conventional registers such as general purpose registers (GPRs) 116 and special purpose registers (SPRs) 118 are connected to the n fixed point unit 122, n branch unit 112 and the thread switch logic 300. Also, floating point registers (FPRs) 114 are connected between the floating point unit 132 and GPRs 116.

Furthermore, a level 1 data cache (L1 D-cache) 50 is connected to the instruction unit 110 via SCU 200 containing cache line buffer 210 and via bus 220. A level 2 cache (L2 cache) 180 and main memory 140 are also connected to the instruction unit 110 in this fashion.

A translation lookaside buffer (TLB) 120, a segment lookaside buffer (SLB) 125 and segment registers (SRs) 135 are connected to the L1 I-cache 100 and SCU 200. Within the L1 I-cache, there is I-cache control logic and the ERAT 410 as further described in relation to FIG. 2.

Figure 2:
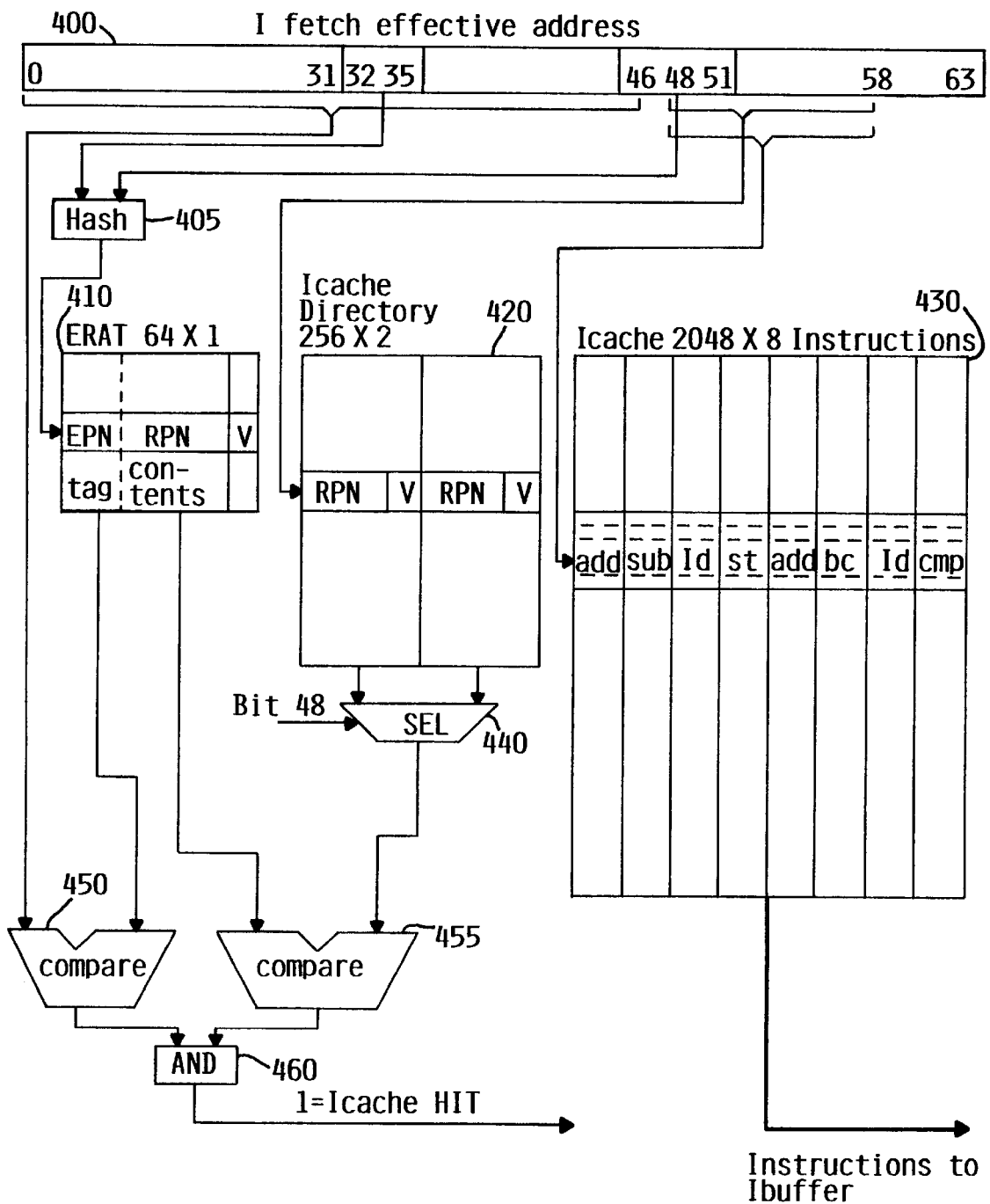
FIG. 2 is a detailed, structural diagram of the I-cache organization and logic.

FIG. 2 illustrates the internal construction of the L1 I-cache 100 by showing an I fetch effective address being fed into the I cache control logic. The L1 I cache 100 includes an instruction cache 430. In this example, the I cache 430 is a 2048×8 instruction I cache which stores the most recently used instructions or instructions most likely to be used in the future. Instructions accessed in the I cache 430 are fed to the I buffer upon an I cache hit. The I cache 430 is addressed by a field of the effective address which, in this example, includes EA bits 48–58.

The I cache 100 also includes an I cache directory 420, selector (SEL) 440, ERAT 410, hash 405, comparators 450, 455 and logical AND gate 460 which are connected as follows.

The I cache directory 420 receives a field of the effective address. In the example shown in FIG. 2, I cache directory 420 is a 256×2 directory receiving EA bits 48–56, which is utilized to address the I cache directory to output corresponding real page numbers. One of these real page numbers is selected by selector 440 and fed to comparator 455.

The effective-to-real address translation cache 410 receives a hashed portion of the effective address, via hash 405, that is utilized to output a line of the effective-to-real address translation cache 410 including an effective page number (EPN) and a real page number (RPN). The real page number from the effective-to-real address translation cache 410 is fed to comparator 455 and compared against the real page number output from the I cache directory 420. If comparator 455 outputs a 1, then this correct comparison indicates an I cache directory hit.

The effective-to-real address translation cache 410 also outputs an effective page number that is fed to comparator 450. Comparator 450 compares the effective page number output from effective-to-real address translation cache 410 against another field of the effective address. In this example, comparator 450 compares bits 0–46 of the effective address against the effective page number output from effective-to-real address translation cache 410. A valid comparison from comparator 450 indicates an effective-to-real address translation cache hit.

AND gate 460 then ANDs the outputs from comparators 450 and 455. If there is a directory hit and an effective-to-real address translation cache hit, then there is an I cache hit outputted from AND gate 460. If not, then there is an I cache miss.

FIG. 3a illustrates the two types of effective addresses, which include a 32-bit segment register mode effective address in which 32 bits of the 64-bit word specify the effective address. More specifically, a 4-bit field labeled SR specifies which of the 16 segment registers contain the corresponding virtual address. The virtual address is then concatenated with the offset field to access the translation lookaside buffer 120 and thereby obtain the real address.

The 64-bit mode effective address includes a tag or segment identification (ID) that is utilized to address a segment table to obtain a virtual address that is concatenated with the offset to address the translation lookaside buffer 120 and thereby obtain the real address.

FIG. 3b illustrates the effective-to-real address translation cache 410 in more detail. As shown, the effective-to-real address translation cache 410 includes two fields for each entry including a tag or effective address field and a real address field. For a segment register entry corresponding to a 32-bit segment register mode effective address translation, the effective address field has the same structure as the 32-bit segment register mode effective address. On the right side corresponding to the effective address is shown the real address XYZ. A second, normal entry is shown in FIG. 3b including effective address ABC and real address DEF. Still further, a validity bit may be utilized for each entry in the ERAT 410.

FIG. 3c illustrates the effective-to-real address translation cache segment register latch (ERAT-SR) 500. Because the illustrated implementation utilizes 16 segment registers 135, the effective-to-real address translation cache segment register latch has a corresponding number (16) of bits. Each bit in the effective-to-real address translation cache segment register latch 500 corresponds uniquely with a segment register 135.

FIG. 3d illustrates the ERAT invalidate pending latch 550, which may be implemented with a single bit or flag.

The effective-to-real address translation cache segment register latch 500 and effective-to-real address translation cache invalidate pending latch 550 may be situated within the instruction unit 110. Furthermore, the logic for managing the effective-to-real address translation cache segment register latch 500 and effective-to-real address translation cache invalidate pending latch 550 may also be constructed within instruction unit 110.

Operation of the Invention

The invention described above performs effective-to-real address translation in both the 32-bit segment register mode and 64-bit mode as generally known in the art. As described above, these processes employ a two-step effective-to-virtual and then virtual-to-real address translation using either segment registers 135 and translation lookaside buffer 120 or the segment lookaside buffer 125 and translation lookaside buffer 120 in the 64-bit mode to perform an effective-to-real address translation. The most recently translated addresses are stored in the effective-to-real address translation cache 410 also as known in the art.

The present invention intelligently manages the effective-to-real address translation cache 410 by utilizing the effective-to-real address translation cache segment register latch 500 and effective-to-real address translation cache invalidate pending latch 550.

Figure 4:
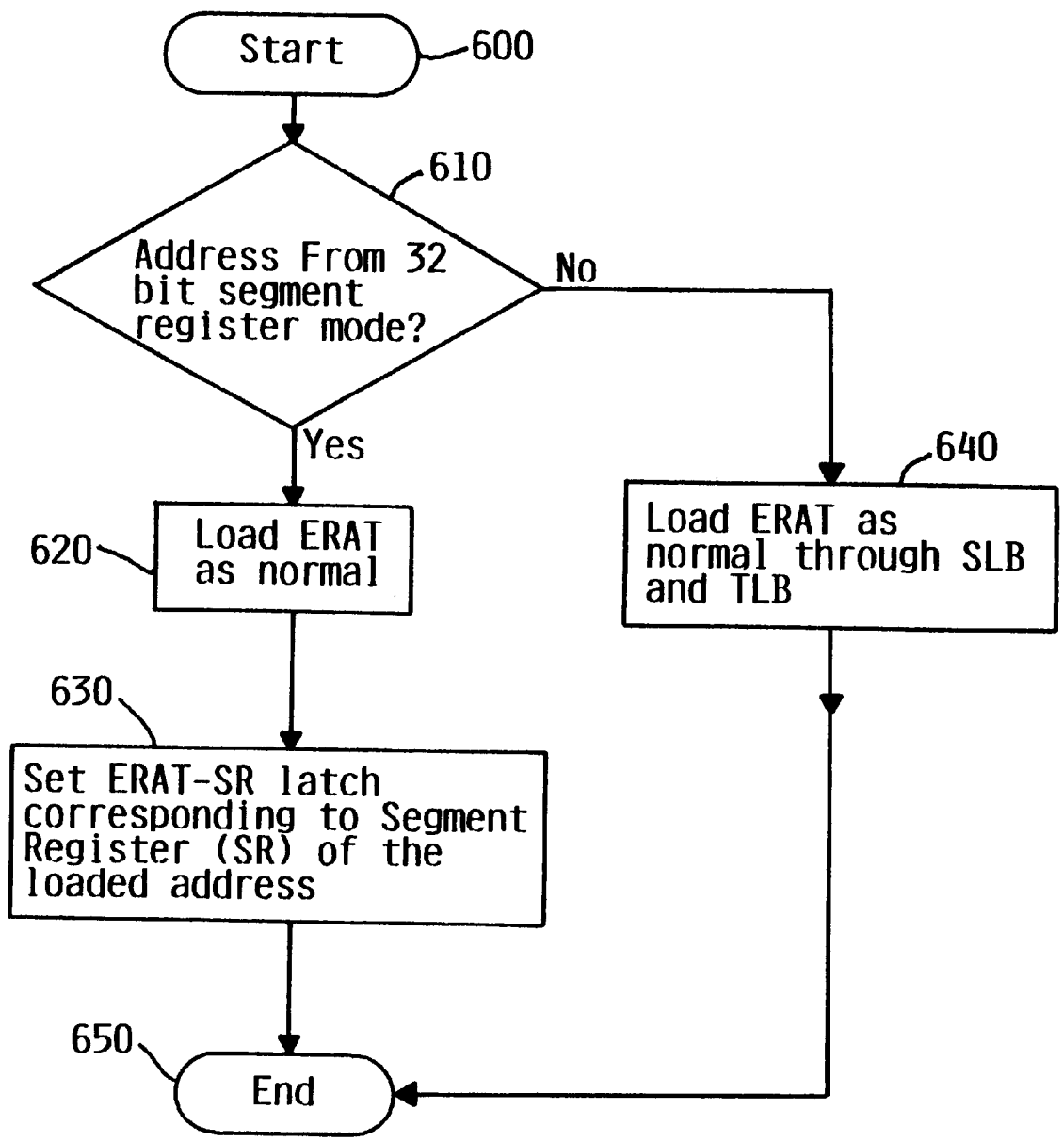
FIG. 4 is a high-level flow chart illustrating a process for loading the effective-to-real address translation cache upon an effective-to-real address translation cache miss according to the present invention.

The first process for managing the effective-to-real address translation cache is the effective-to-real address translation cache loading process upon an effective-to-real address translation cache miss as shown in the high-level flow chart of FIG. 4. The process for loading the effective-to-real address translation cache 410 upon an effective-to-real address translation cache miss begins with start step 600 as shown in FIG. 4. Then, the process decides whether the address is from a 32-bit segment register mode in step 610. If not, then 64-bit addressing is being utilized, and the process proceeds by loading the effective-to-real address translation cache 410 as normal through the segment lookaside buffer 125 and translation lookaside buffer 120 as generally known in the art as indicated by step 640. Thereafter, the 64-bit addressing mode for loading the effective-to-real address translation cache 410 ends as indicated by step 650.

If step 610 determines that 32-bit segment register mode addressing is being utilized, then step 620 loads the effective-to-real address translation cache 410 as conventionally known by accessing the segment registers 135 and translation lookaside buffer 120 in step 620. Then, the invention sets a corresponding bit in the effective-to-real address translation cache segment register latch 500 that corresponds to the segment register 135 that was accessed in step 620 to translate the effective address to the virtual address. In this way, the invention keeps track of which segment registers 135 have been utilized to load the effective-to-real address translation cache 410. Thereafter, the effective-to-real address translation cache loading process for the 32-bit addressing modes ends as indicated by step 650.

Figure 5:
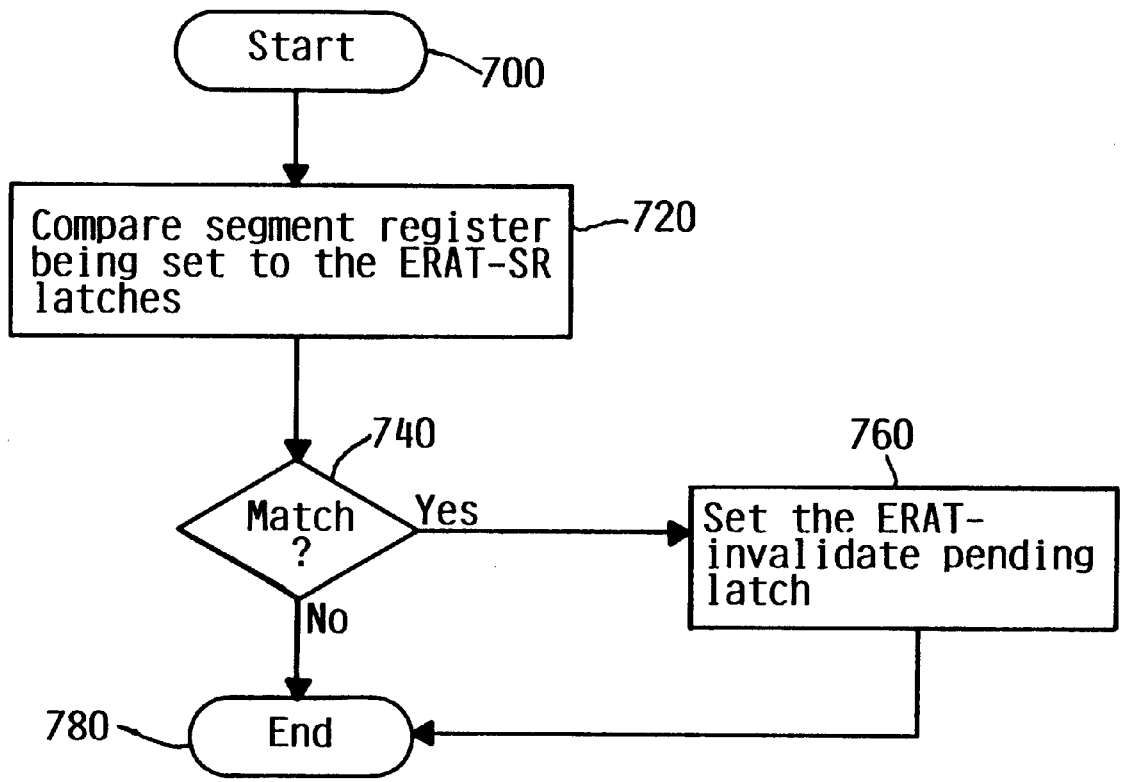
FIG. 5 is the resulting process flow after a move to segment register instruction is executed according to the present invention.

Effective-to-real address translation cache segment register cache management continues as shown in FIG. 5. Upon the execution of a move to segment register (MTSR) instruction, the process flow in FIG. 5 begins as indicated by step 700. Then, step 720 compares the segment register being set by the move to segment register instruction to the effective-to-real address translation cache segment register latch 500. If the segment register 135 being affected by the move to segment register instruction has already been utilized to load an effective-to-real address translation in the effective-to-real address translation cache 410, then step 720 will determine this occurrence by examining the bit in the effective-to-real address translation cache segment register latch 500 corresponding to this segment register 135 to see if a match occurs. If step 740 determines that such a match has occurred, then step 760 sets the effective-to-real address translation cache invalidate pending latch 550.

If no match occurs or after the effective-to-real address translation cache invalidate pending latch is set by step 760, then this process ends as indicated by step 780.

Many computer architectures, such as the PowerPC® architecture, allow the actual invalidation of the effective-to-real address translation cache to be delayed until a context synchronizing event occurs. The present invention takes advantage of this capability as indicated by FIG. 6.

Figure 6:
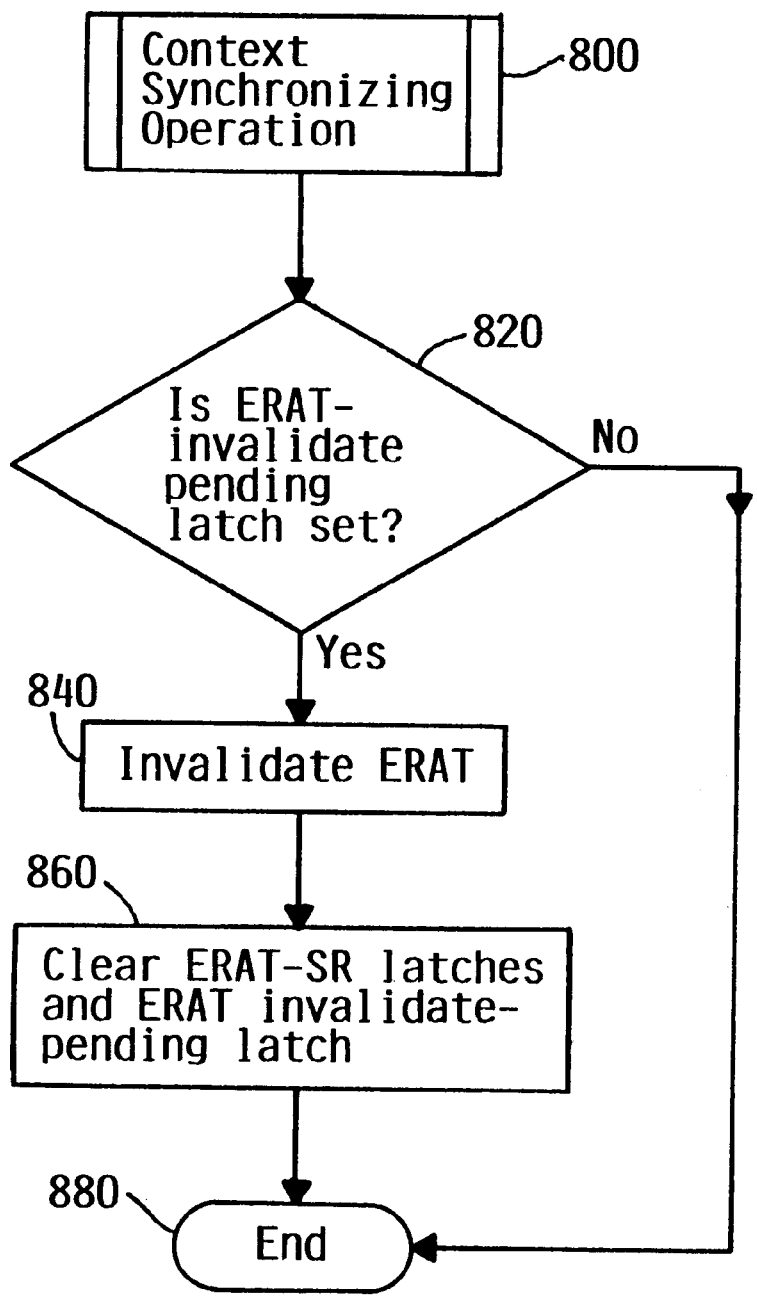
FIG. 6 is a high-level flow chart illustrating the effective-to-real address translation cache invalidating process according to the present invention.

FIG. 6 illustrates the effective-to-real address translation cache invalidation process, which begins with a context synchronizing operation 800. Upon the occurrence of context synchronizing operation 800, step 820 then examines the effective-to-real address translation invalidate pending latch 550. If step 820 determines that the effective-to-real address translation cache invalidate pending latch 550 has not been set, then the process ends as indicated by step 880 and the effective-to-real address translation cache 410 is not invalidated.

If, on the other hand, step 820 determines that the effective-to-real address translation cache invalidate pending latch 550 has been set, then step 840 actually invalidates the effective-to-real address translation cache 410 at that time. It is to be noted that two events must occur to invalidate the effective-to-real address translation cache 410. The first event is the context synchronizing operation. When the context synchronizing occurs, then the effective-to-real address translation cache invalidate pending latch 550 must also be set to invalidate the effective-to-real address translation cache 410 in step 840.

Thereafter, the effective-to-real address translation cache segment register latch 500 and the effective-to-real address translation cache invalidate pending latch 550 may be cleared or otherwise reset in step 860. The process is then complete as indicated by end step 880.

By utilizing the above elements, the present invention can intelligently manage the effective-to-real address translation cache, and particularly, the timely invalidation of the effective-to-real address translation cache without unduly affecting processor performance. By maintaining indicators in the effective-to-real address translation cache segment register latch 500 indicating which of the segment registers 135 are currently mapped in the effective-to-real address translation cache 410, the invention can then determine when a move to segment register instruction renders the effective-to-real address translation cache invalid.

Upon the execution of a move to segment register instruction, the invention examines the effective-to-real address translation cache segment register latch 500 to determine if the segment register 135 that the move is going to is one of the segment registers 135 currently mapped in the effective-to-real address translation cache 410. If no match is detected, no further action is taken. If a match is detected, the hardware will set the effective-to-real address translation cache invalidate pending latch 550. When the processor detects a context-synchronizing event, and the effective-to-real address translation cache invalidate pending latch 550 is set, the hardware will then and only then invalidate the effective-to-real address translation cache 410. The hardware is then reset by clearing the effective-to-real address translation cache segment register latch 550 and the effective-to-real address translation cache invalidate pending latch 550.

Delaying the effective-to-real address translation cache invalidation causes fewer invalidations to occur and results in greater processor efficiency. The following exemplary code stream illustrates the increased processor efficiency of the present invention.

MTSR 1,G1 (move general purpose register G1 to segment register 1)

MTSR 2,G2 (move general purpose register G2 to segment register 2)

MTSR 3,G3 (move general purpose register G3 to segment register 3)

MTSR 4,G4 (move general purpose register G4 to segment register 4)

MTSR 5,G5 (move general purpose register G5 to segment register 5)

ISYNC (context synchronizing event)

Conventional effective-to-real address cache invalidation mechanisms would blindly invalidate the effective-to-real address translation cache 410 after each of the MTSR instructions. Such conventional effective-to-real address translation cache invalidation mechanisms would invalidate the effective-to-real address translation cache five times with the above code stream. In contrast, the present invention would invalidate the effective-to-real address translation cache 410 only once with the above code stream.

If, however, the number of effective-to-real address translation invalidations is too high, the effective-to-real address translation cache can be split into halves, each with its own effective-to-real address translation segment register latch and effective-to-real address translation invalidate-pending latch. When an address from 32-bit segment mode is loaded into the effective-to-real address translation cache, the effective-to-real address translation segment register latch for that half of the effective-to-real address translation cache is updated but not the latch for the other half of the effective-to-real address translation cache. The process for an MTSR instruction compares the segment register being set to each effective-to-real address translation segment register latch and sets the corresponding effective-to-real address translation invalidate-pending latch. At a context synchronizing operation, each half of the effective-to-real address translation cache is invalid according to its own effective-to-real address translation invalidate-pending latch. In this way, there will be times that only half the effective-to-real address translation cache is invalidated compared to the entire effective-to-real address translation cache in the basic operation disclosed. Of course, the effective-to-real address translation cache could also be divided into fourths or eighths and so on, as a way to reduce the number of entries invalidated.

The above techniques of controlling and managing the effective-to-real address translation cache 410 may be implemented with discreet logic elements within the instruction unit 110. Alternatively, the above process control may be implemented in software to program the instruction unit 110 and thereby arrive at a specially program machine. The choice between hardware, software, firmware, or a mixture of these elements are routine choices within the scope of the present invention and may be implemented by those of ordinary skill in the art using known techniques.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An address translation cache management apparatus, comprising:
    an address translation cache storing recent effective-to-real address translations;
    a latch having at least one bit for each one of a plurality of segment registers;
    an invalidate pending latch;
    loading means for loading said address translation cache with an effective-to-real address translation upon an address translation cache miss with an address generated by one of the segment registers and a translation lookaside buffer;
    means for setting a bit of said latch corresponding to the segment register utilized by said loading means;
    means for setting said invalidate pending latch when a value stored by one of the segment registers is altered and when a corresponding bit in said latch has already been set for the segment register whose contents have been altered; and
    invalidating means for invalidating said address translation cache when a context-synchronizing event occurs and said invalidate pending latch is set.

2. The address translation cache management apparatus according to claim 1, further comprising:
    means for clearing said latch when said invalidating means invalidates said address translation cache.

3. The address translation cache management apparatus according to claim 1, further comprising:
    means for clearing said invalidate pending latch when said invalidating means invalidates said address translation cache.

4. The address translation cache management apparatus according to claim 1, said loading means including:
    first loading means for loading said address translation cache with an effective-to-real address translation upon a cache miss with an address generated by one of the segment registers and the translation lookaside buffer when the apparatus is in a segment register address generation mode; and
    second loading means for loading said address translation cache with an effective-to-real address translation upon a cache miss with an address generated by a segment lookaside buffer and the translation lookaside buffer when the apparatus is not in the segment register address generation mode.

5. The address translation cache management apparatus according to claim 1, wherein said means for setting said invalidate pending latch sets said invalidate pending latch when a move to segment register instruction has been performed thereby altering a value stored by one of the segment registers and when a corresponding bit in said latch has already been set for the segment register whose contents have been altered by the move to segment register instruction.

6. A method of managing a address translation cache, comprising the steps of:
    storing recent effective-to-real address translations in the address translation cache;
    providing a latch having at least one bit for each segment register;
    providing an invalidate pending latch;
    loading the address translation cache with an effective-to-real address translation upon a cache miss with an address generated by a segment register and a translation lookaside buffer;
    setting a bit of the latch corresponding to the segment register utilized by said loading step;
    setting the invalidate pending latch when a value stored by one of the segment registers is altered and when a corresponding bit in the latch has already been set for the segment register whose contents have been altered; and
    invalidating the address translation cache when a context-synchronizing event occurs and the invalidate pending latch is set.

7. The method of managing an address translation cache according to claim 6, further comprising the steps of:
    clearing the latch when said invalidating step invalidates the address translation cache.

8. The method of managing an address translation cache according to claim 6, further comprising the steps of:
    clearing the invalidate pending latch when said invalidating step invalidates the address translation cache.

9. The method of managing an address translation cache according to claim 6, said loading step further including the substeps of:
    loading the address translation cache with an effective-to-real address translation upon a cache miss with an address generated by one of the segment registers and the translation lookaside buffer when a segment register address generation mode is active; and loading the address translation cache with an effective-to-real address translation upon a cache miss with an address generated by a segment lookaside buffer and the translation lookaside buffer when the segment register address generation mode is not active.

10. The method of managing an address translation cache according to claim 6, wherein said step of setting the invalidate pending latch sets the invalidate pending latch when a move to segment register instruction has been performed thereby altering a value stored by one of the segment registers and when a corresponding bit in the latch has already been set for the segment register whose contents have been altered by the move to segment register instruction.

11. A computer system, comprising:

a main memory having a plurality of memory locations each of which may be accessed by a real address, said main memory organized into segments and pages;

an instruction cache storing recent instructions from said main memory;

segment registers connected to said instruction cache;

a translation lookaside buffer connected to said instruction cache;

said instruction cache including an address translation cache storing recent effective-to-real address translations;

a latch having at least one bit for each one of said segment registers, and an invalidate pending latch; and an instruction unit connected to said main memory and said instruction cache, said instruction unit processing instructions from said instruction cache upon an instruction cache hit and processing instructions from said main memory upon an instruction cache miss;

said instruction unit loading said address translation cache with an effective-to-real address translation upon an address translation cache miss with an address generated by one of the segment registers and a translation lookaside buffer;

said instruction unit setting a bit of said latch corresponding to the segment register utilized to load the address translation;

said instruction unit setting said invalidate pending latch when a value stored by one of the segment registers is altered and when a corresponding bit in said latch has already been set for the segment register whose contents have been altered; and said instruction unit invalidating said address translation cache when a context-synchronizing event occurs and said invalidate pending latch is set.

* * * * *